United States Patent [19]
Melzer et al.

[11] Patent Number: 5,898,713
[45] Date of Patent: Apr. 27, 1999

[54] IP CHECKSUM OFFLOAD

[75] Inventors: Clifford B. Melzer, Los Gatos, Calif.; Jonathan Rosen, Chapel Hill, N.C.; Robert O'Gorman; Paul A. Wood, both of Raleigh, N.C.; Mark C. Drummond, Catonsville, Md.; Dean Hiller, Shrub Oak, N.Y.

[73] Assignee: Cisco Technology, Inc., San Jose, Calif.

[21] Appl. No.: 08/921,158

[22] Filed: Aug. 29, 1997

[51] Int. Cl.$^6$ .................................................. G06F 11/00
[52] U.S. Cl. .......................... 371/53; 371/30; 395/185.05; 395/200.6
[58] Field of Search ..................... 371/53, 20.1, 34, 371/67.1, 68.1, 68.2, 30, 32, 35, 37.01; 395/182.02, 182.19, 185.01, 185.05, 185.09, 200.54, 200.6, 200.61, 200.62, 200.66, 185.08, 200.67, 200.8; 364/240.8, 242.94, 242.95, 242.96, 242.5, 265.1, 266.3, 266.4, 940.81, 238.2, 238.3, 239.5, 239.51, 240.1, 240.2

[56] References Cited

U.S. PATENT DOCUMENTS

| | | | |
|---|---|---|---|
| 5,014,265 | 5/1991 | Hahne et al. | 370/236 |
| 5,072,449 | 12/1991 | Enns et al. | 371/37.02 |
| 5,128,945 | 7/1992 | Enns et al. | 371/37.02 |
| 5,260,936 | 11/1993 | Bardet et al. | 371/53 |
| 5,280,470 | 1/1994 | Buhrke et al. | 370/232 |
| 5,430,842 | 7/1995 | Thompson et al. | 395/200.66 |
| 5,491,802 | 2/1996 | Thompson et al. | 395/200.66 |
| 5,636,371 | 6/1997 | Yu | 364/242.94 |
| 5,663,952 | 9/1997 | Gentry, Jr. | 371/53 |

OTHER PUBLICATIONS

AIX Version 3.2, "*Enterprise Systems Connection Adapter: User's Guide and Service Information*", IBM, 1993, pp. 1.1–9.8.

*Primary Examiner*—Trinh L. Tu
*Attorney, Agent, or Firm*—Cesari and McKenna, LLP

[57] ABSTRACT

A technique enables a control unit to perform checksum operations for packets, which operations are otherwise performed by a host computer of a computer network. The technique involves the use of two data links coupled between the host and control unit; one data link is used for exchanging "normal" IP packets without checksum operations performed thereon by the control unit and the other link is used for exchanging IP packets that have undergone or will undergo checksum operations by the control unit. By "offloading" checksum operations to the control unit, the technique reduces processor cycles consumed by the host, thereby improving the performance of the host computer and network.

13 Claims, 5 Drawing Sheets

IP CHECKSUM OFFLOAD

BACKGROUND OF THE INVENTION

Data communication in a computer network involves the exchange of data between two or more entities interconnected by communication links. The entities are typically software programs executing on hardware computer platforms, such as nodes; in particular, communication software executing on the nodes correlate and manage data communication with other nodes. The nodes typically communicate by exchanging discrete packets or frames of data according to predefined protocols. In this context, a protocol consists of a set of rules defining how the nodes interact with each other. Collectively, these hardware and software components comprise a communications network and their interconnections are defined by an underlying architecture.

Modern communications network architectures are typically organized as a series of hardware and software levels or "layers" within each node that interact to format data for transfer over the network. Predetermined services are performed on the data as it passes through each layer and the layers communicate with each other by means of the predefined protocols. The lower layers of these architectures are typically implemented in hardware and firmware, whereas the higher layers are generally implemented in the form of software running on the nodes attached to the network. Examples of such communications architectures include the the Internet communications architecture and the Systems Network Architecture (SNA) developed by International business Machines (IBM) Corporation.

SNA is a mainframe-oriented network architecture that includes services generally similar to those defined in the Internet communications architecture. An SNA network consists of nodes and links, wherein the nodes are network components containing protocol implementations and the links are transmission facilities that carry data between two nodes configured to operate a data link control procedure. Examples of such nodes include a host mainframe computer, a control unit and an input/output (I/O) device that provides a user interface to the network. In one embodiment of the SNA network, the control unit and I/O device may be combined within a node, such as a workstation, that is coupled to a endstation node through a network cloud, such as an SNA or Internet protocol (IP) cloud. In another embodiment, the control unit may be independent of the workstation and include a router to enable routing of data through the network to destination nodes, such as workstations.

The host is typically connected to the control unit through a high-performance communication subsystem called a mainframe channel. The channel comprises a plurality of components including an intelligent processor (i.e., channel CPU) that manages the protocol over the communications link and controls transfer of data between host (main memory) storage and I/O devices directly attached to the control unit. To that end, a channel may use one or more channel paths as the actual links between a host and the control unit. Channel paths include physical transmission links between the channel and control unit; examples of channel paths include bus-and-tag and enterprise system connection (ESCON) channel paths. Moreover, each I/O device is represented by a subchannel. A subchannel is similar to a virtual circuit in that it provides information about the associated I/O device and its attachment to the channel.

When communicating with an endstation by exchanging data packets over the channel and network, the host computer typically performs operations on the packets to ensure the accuracy of communication. An example of such an operation performed by the transport layer of a protocol stack in the host computer is a checksumming operation for certain packets, such as Transmission Control Protocol (TCP) packets and User Datagram Protocol (UDP) packets. A checksum is an error detection and recovery service that involves processing various header and information fields of a packet through an arithmetic algorithm. The checksum is typically calculated by a source node (such as a host computer) when building a TCP (or UDP) header for a packet and the resulting checksum value is loaded into the packet before transmission over a channel. Specifically, the checksum is calculated in accordance with a conventional algorithm (e.g., a TCP or UDP checksum algorithm) such that the sum of all the data, including portions of the headers, results in a checksum value that is then stored in a checksum field of a corresponding header. A destination node (which may also be a host computer) recalculates the checksum using an identical algorithm and verifies the results of the checksum algorithm. If the destination-node cannot verify the results, the received packet is considered to be in error and is discarded.

It can be appreciated that a checksum operation is a significant processing function typically performed by the host computer. However, it can also be appreciated that such processing is expensive from the point of view of the host computer receiving or sending the packets. It would be desirable to relieve the host computer of such processing and still ensure the accuracy of communication over a network; the present invention is directed to a technique by which the host computer can offload performance of such an operation to the control unit.

SUMMARY OF THE INVENTION

The invention comprises a checksum offload technique for enabling a control unit to perform checksum operations for IP packets, which operations are otherwise performed by a host computer of a computer network. The technique involves the use of two data links coupled between the host and control unit; one data link is used for exchanging "normal" IP packets without checksum operations performed thereon by the control unit and the other link is used for exchanging IP packets that have undergone or will undergo checksum operations by the control unit. By "offloading" such checksum operations, the inventive technique reduces CPU cycles consumed by the host, thereby improving the performance of the host computer and network.

In the illustrative embodiment of the invention, the checksum offload technique may be implemented as an option of an option request protocol configured to allow dynamic negotiation between the host and control unit. Here, the host computer transmits an option request control message specifying a checksum offload option to the control unit over a control link of the computer network. The checksum offload option requests the control unit to invoke a checksum offload protocol between applications residing on the host and control unit as specified in the option request control message. If the control unit is configured to interpret the control message and further "agrees" to perform the checksum offload operation between the specfied applications, it returns a favorable response. A connection request sequence is then executed among the host and control unit to create a logical link over which the checksum offloaded packets are exchanged.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
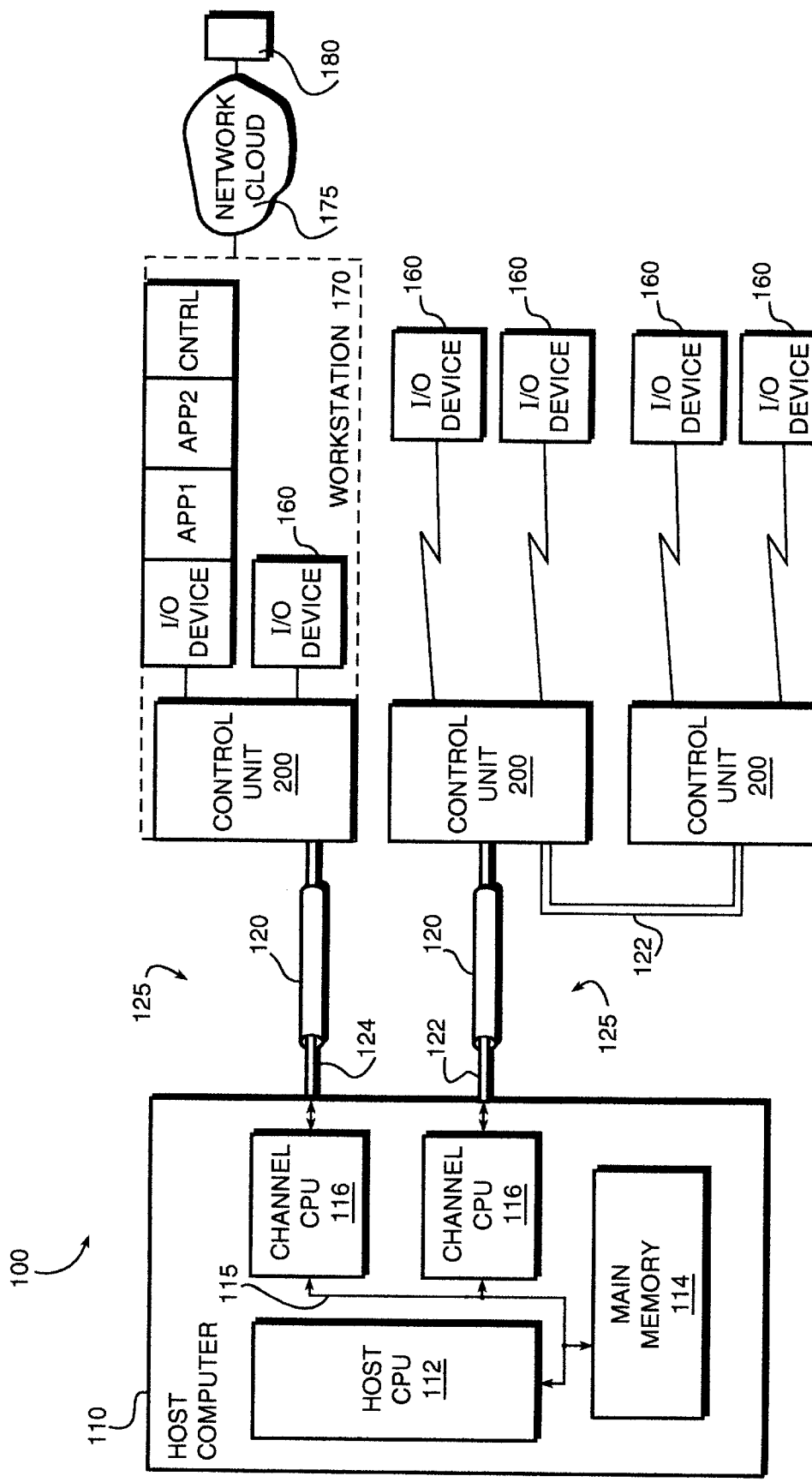
FIG. 1 is a block diagram of a computer network comprising a collection of interconnected nodes, such as a host computer and at least one control unit.

FIG. 1 is a block diagram of a computer network 100 comprising a collection of interconnected nodes, such as a host computer 110 and at least one control unit 200. The host computer comprises a host central processing unit (CPU 112), a main memory 114 and at least one channel CPU 116 interconnected by a bus 115. Communication link 120 couples the channel CPU 116 to the control unit 200 which, in turn, is directly attached to input/output (I/O) devices 160. In an embodiment of the network 100 that may be advantageously used with the invention, the control unit and I/O devices within an integrated node, such as a workstation 170, which is coupled to an end station 180 via a network (e.g., SNA or IP) cloud 175. In the illustrative embodiment described herein, however, the control unit 200 is an independent node comprising, infer alia, a router for routing data through the network to destination nodes (shown as end stations 180). Communication among the nodes is typically effected by exchanging discrete frames or packets of data according to predefined protocols.

For each node, the memory may comprise storage locations addressable by the CPUs for storing software programs and data structures associated with the inventive protocol and messages. Moreover, the CPUs may comprise processing elements or logic for executing the software programs and manipulating the data structures. An operating system, portions of which are typically resident in memory and executed by the CPU, functionally organizes the node by, inter alia, invoking network operations in support of software processes executing on the node. It will be apparent to those skilled in the art that other CPU and memory means, including various computer readable media, may be used for storing and executing program instructions pertaining to the inventive techniques described herein.

The channel CPU and communication link collectively interact to form a mainframe channel 125 to effectively separate execution of I/O operations from the host computer's execution of data processing programs. Each I/O device 160 is represented by a subchannel (not shown) that provides information about the I/O device and its attachment to the channel 125. Functionally, the channel CPU 116 manages the protocol over the communication link 120 and controls transfer of data directly between main memory 114 and the control unit 200. To that end, the channel CPU may use one or more logical and physical links of the channel 125 as paths between the host and the control unit. Examples of a physical transmission link include a bus-and-tag path 122 and an enterprise system connection (ESCON) path 124.

The bus-and-tag channel path 122 is a byte-wide parallel bus with data on one cable (the "bus") and a set of control lines on another cable (the "tag"). The control lines govern the transfer of control information and data over the parallel bus. For this path implementation, each channel is connected to a first control unit in a chain consisting of 1 to 8 control units. The chain acts as a bus, connecting each channel to a series of control units. The ESCON channel path 124, on the other hand, consists of a pair of fiber optic cables that employ a serial, packet-switching architecture with control information such as packet framing and cyclic redundancy check (CRC) characters. Standard bus-and-tag protocol indications are conveyed within packets instead of through bus-and-tag lines.

Figure 2:
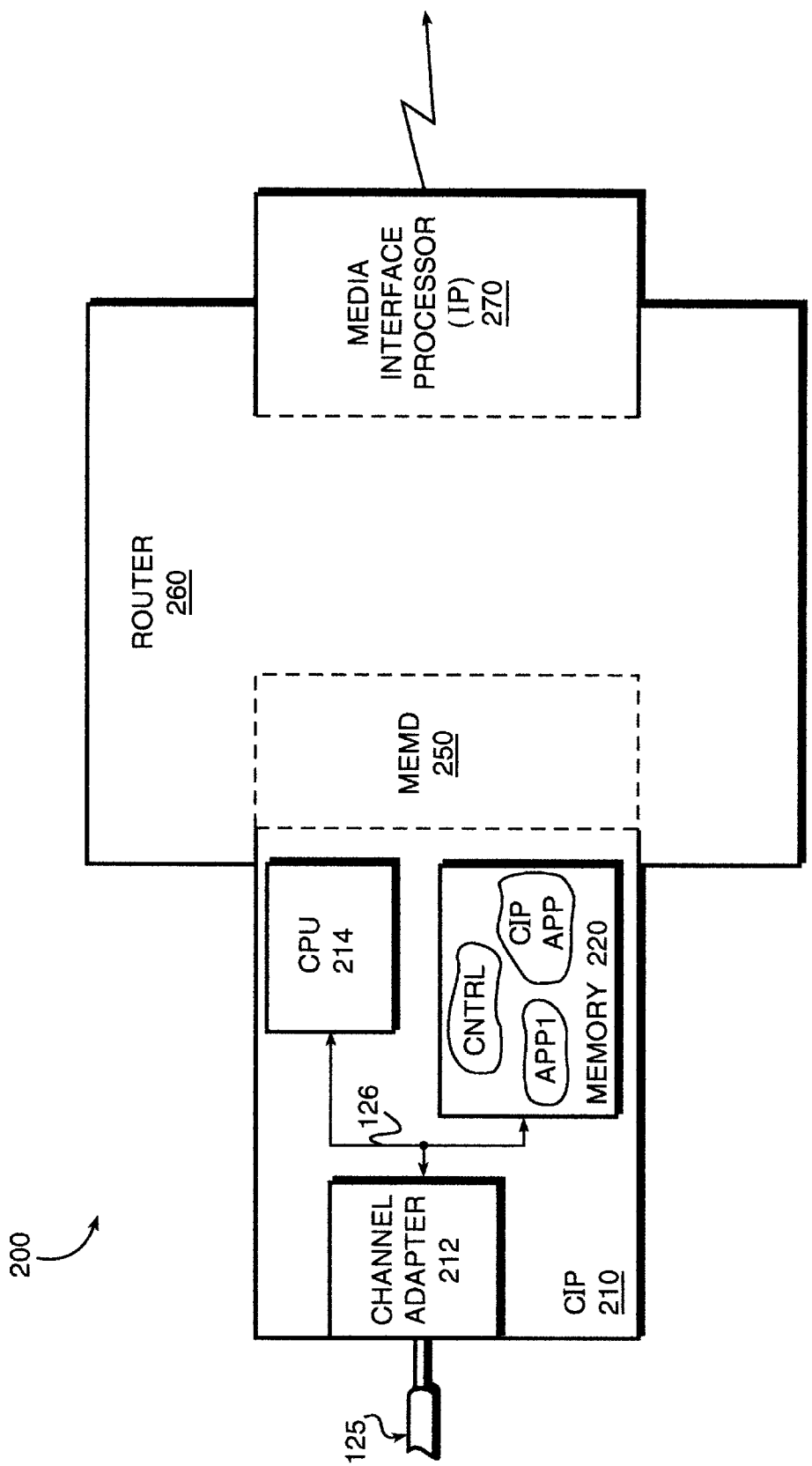
FIG. 2 is a block diagram of the control unit of FIG. 1.

FIG. 2 is a block diagram of an illustrative embodiment of the control unit 200 comprising an inbound or channel interface processor (CIP) 210 a memory switching fabric (MEMD) 250, a router 260 and an outbound or media interface processor (IP) 270. The IP 270 provides an outbound interface connection to a plurality of different wide area and local area network media (e.g., token ring, FDDI and Ethernet) to enable transfer of data packets over those media. The router 260 is configured to facilitate the flow of the data packets throughout the network by routing them to proper destination nodes.

The CIP 210 provides high-performance, multiprotocol network access to the host computer 110 and, to that end, includes a channel adapter 212 that directly couples to the channel 125 and, in particular, to the physical bus-and-tag and ESCON channel paths. A CPU 214 and memory 220 of the CIP cooperate with the channel 125 to relieve the host 110 from tasks associated with direct communication with destination nodes, such as workstations, thereby saving host resources while allowing concurrent data and I/O processing. Control and application programs stored in the memory 220 communicate with respective programs in the host via the exchange of, e.g., Internet protocol (IP) data packets in accordance with a protocol; an example of a protocol used in connection with the illustrative embodiment of the present invention is the common link access to workstation (CLAW) protocol.

When communicating with a destination node by exchanging IP packets over the channel and network, the host computer typically performs operations on the packets to ensure the accuracy of communication. An example of such an operation performed by the transport layer of a protocol stack in the host computer is a checksumming operation for certain packets, such as Transmission Control Protocol (ICP) packets and User Datagram Protocol (UDP) packets. The checksum operation is a significant processing function that is expensive from the point of view of the host computer receiving or sending the packets. It would be desirable to relieve the host computer of such processing and still ensure the accuracy of communication over a network.

In accordance with the present invention, a technique is provided by which the host computer can offload performance of such an operation to the control unit. The checksum offload technique comprises two data links coupled between the host and control unit; one data link is used for exchanging "normal" IP packets without checksum operations performed thereon by the control unit and the other link is used to exchange IP packets that have undergone or will undergo checksum operations by the control unit. By "offloading" such checksum operations to the control unit, the inventive technique reduces CPU cycles consumed by the host, thereby improving the performance of the host computer and network.

In the illustrative embodiment of the invention, the checksum offload technique may be implemented as an option of an option request protocol configured to allow dynamic negotiation between the host and control unit. The option request protocol defines a message format for option request and option request response messages; an example of an option request protocol suitable for use with the present invention is disclosed in copending and commonly assigned U.S. patent application Ser. No. 08/920,714 titled, Option Request Protocol, filed on even date herewith, which application is incorporated by reference as though fully set forth herein. It should be noted, however, that there are alternate methods of implementing the checksum offload technique described herein; an example of such an alternate method is static, hardcoding assignment of applications residing in the control unit and host computer that cooperate to invoke the checksum offload technique.

According to the exemplary option request protocol implementation, the host computer functions as an option requester to initiate negotiation of the checksum offload option by issuing an option request message over the control link to the CIP. That is, the host functions as an option requester when generating and sending an option request message to the CIP requesting the CIP to perform checksum offloading for various packets.

Figure 3:
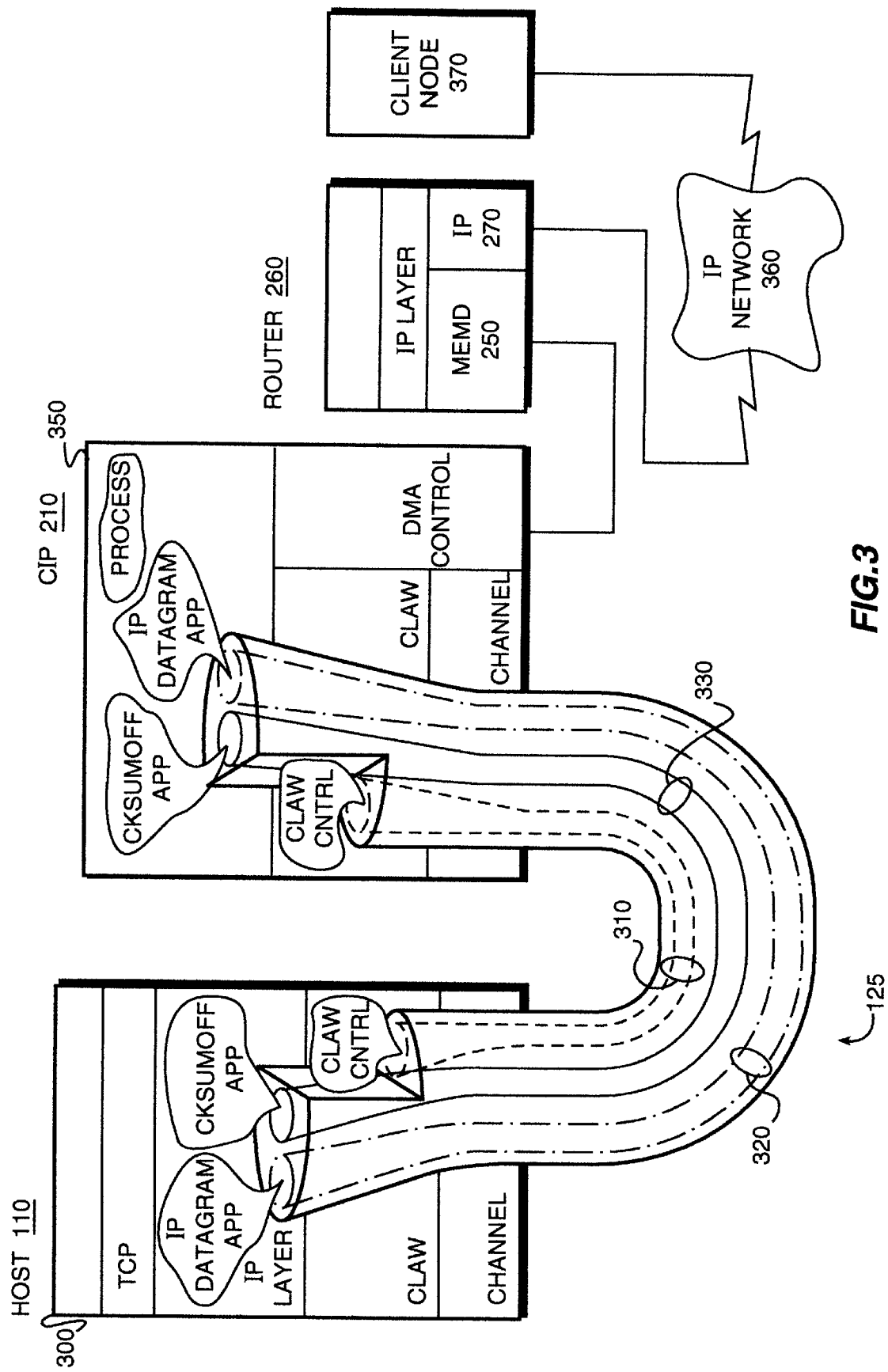
FIG. 3 is a schematic block diagram of protocol stacks within the host computer and the control unit for performing checksum offload operations according to the present invention.

FIG. 3 is a schematic block diagram of the negotiating entities of protocol stacks 300, 350 within the host computer 110 and the CIP 210, respectively, for performing checksum offload operations. The negotiating entities are preferably CLAW applications residing within lower-level layers (e.g., internetwork and data link layers) of the protocol stacks. As used herein, a CLAW application is similar to a service access point in that it identifies a particular port (or access point) to a higher-level layer in a network node involved in a data exchange. A CLAW control entity (CLAW CNTRL) is provided in each node as an application layered upon a CLAW driver layer (CLAW), the CLAW CNTRL application is configured to handle all CLAW option requests.

A system validate exchange occurs between CLAW CNTRL processes executing on the host and CIP to activate a control link connection (shown as dashed lines 310) over channel 125. Once the control link is activated, a connection request sequence is invoked among these CLAW CNTRL processes over link 310 to establish a logical application-application link (shown as dashed-dotted lines 320) for transferring data in response to execution of channel command words (CCWs) of a channel program at the host and CIP. For example, the connection request sequence may be used to establish a data link 320 for initiating the flow of IP datagrams between APPI processes, e.g., IP DATAGRAM APPs, on the host and the CIP.

Figure 4:
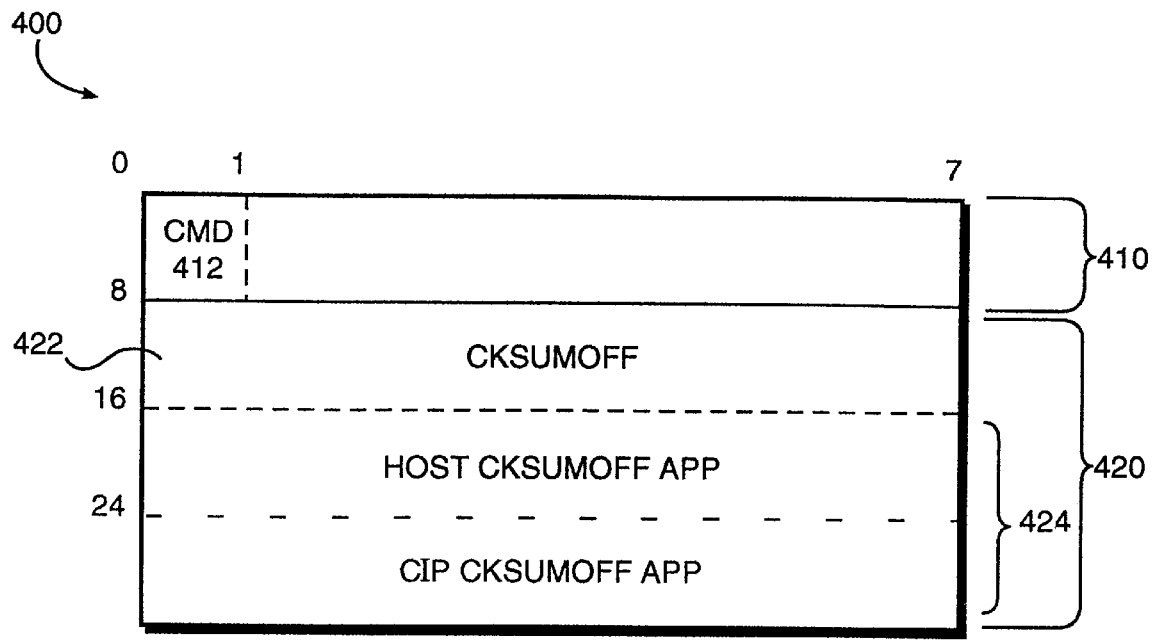
FIG. 4 is a block diagram of the format of an option request control message for requesting invocation of a checksum offload protocol.

In addition to performing system validate and connection request exchanges, the CLAW CNTRL processes interact to establish an additional data link (shown as solid lines 330) used in conjunction with link 320 (e.g., an IP datagram link) for checksum offloading communication between the host and CIP. To initiate the checksum offload option request sequence, the CLAW CNTRL process executing on, e.g., the host 110, generates an option request message and transmits it over the control link 310 to the CIP 210 where it is received at its CIAW CNTRL process, i.e., the option responder. FIG. 4 is a block diagram of the format of an option request control message 400 comprising an 8-byte header 410 and a 24-byte body 420.

Specifically, the option request message 400 requests the CIP to invoke a checksum offload protocol between applications residing on the host and CIP as specified in the option request message. A 1-byte command (CMD) field 412 of the header 410 contains command codes specifying the type of message, such as an option request message (e.g., command code hex 31). The body 420 of the control message 400 includes an 8-byte option name field 422 whose contents specify the name of the requested option; in accordance with the present invention, the requested option is an IP datagram checksum offload (CKSUMOFI;) option. The body 420 also includes a 16-byte option-specific parameter field 424 containing parameters specific to the requested option. In the case of to the checksum offload option described herein, the parameter field 424 contains the host and CIP application names of an IP datagram checksum offload link (CKSUMOFF APP).

Figure 5:
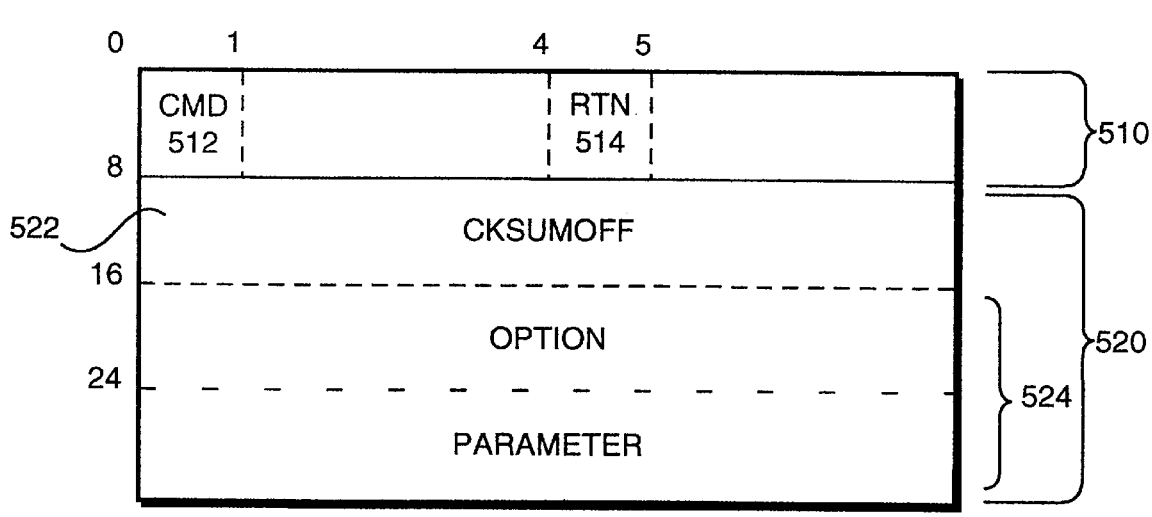
FIG. 5 is a block diagram of the format of an option request response control message for use with the checksum offload request.

In response to receiving and interpreting the option request message, the CIP functions as an option responder by returning an option request response message. FIG. 5 is a block diagram illustrating the format of an option request response control message 500. As with the option request message 400, the option request response 500 comprises a header 510 and a body 520, the latter including an 8-byte option name field 522 whose contents are copied from field 422 and a 16-byte option-specific parameter (OPTION PARAMETER) field 524 containing any option-specific response parameters. The header 510 comprises a 1-byte command (CMD) field 512 that contains command codes specifying the type of message, such as an option request response message (e.g., command code hex 32) and a 1-byte return (RTN) field 514 containing various return codes.

If the option responder is not configured to perform checksum operations, the field 514 contains an "option not supported" code. Alternatively, the return field 514 may contain option-specific return codes pertaining to the specifically-requested option, such as "application names already in use". However if the option responder is configured to perform the checksum offload operation between the specified applications, the contents of field 514 comprise a generic "option accepted" acknowledgement return code; another connection request sequence is then executed between the host and CIP to create another logical data link (FIG. 3 at 330) over which the checksum offloading results are exchanged.

In the illustrative embodiment, the option requester establishes this latter logical link by initiating the connection request sequence. It is possible that either the option requester or option responder could independently initiate the connection request sequence, as long as there is a routine in place to avoid a race condition caused by simultaneous initiation of the connection request. As described below, two data links are needed for implementation of the IP datagram checksum offload option: one link for "normal" IP datagram without checksum offload transmissions and the other for IP datagram checksum offload communication.

Figure 6:
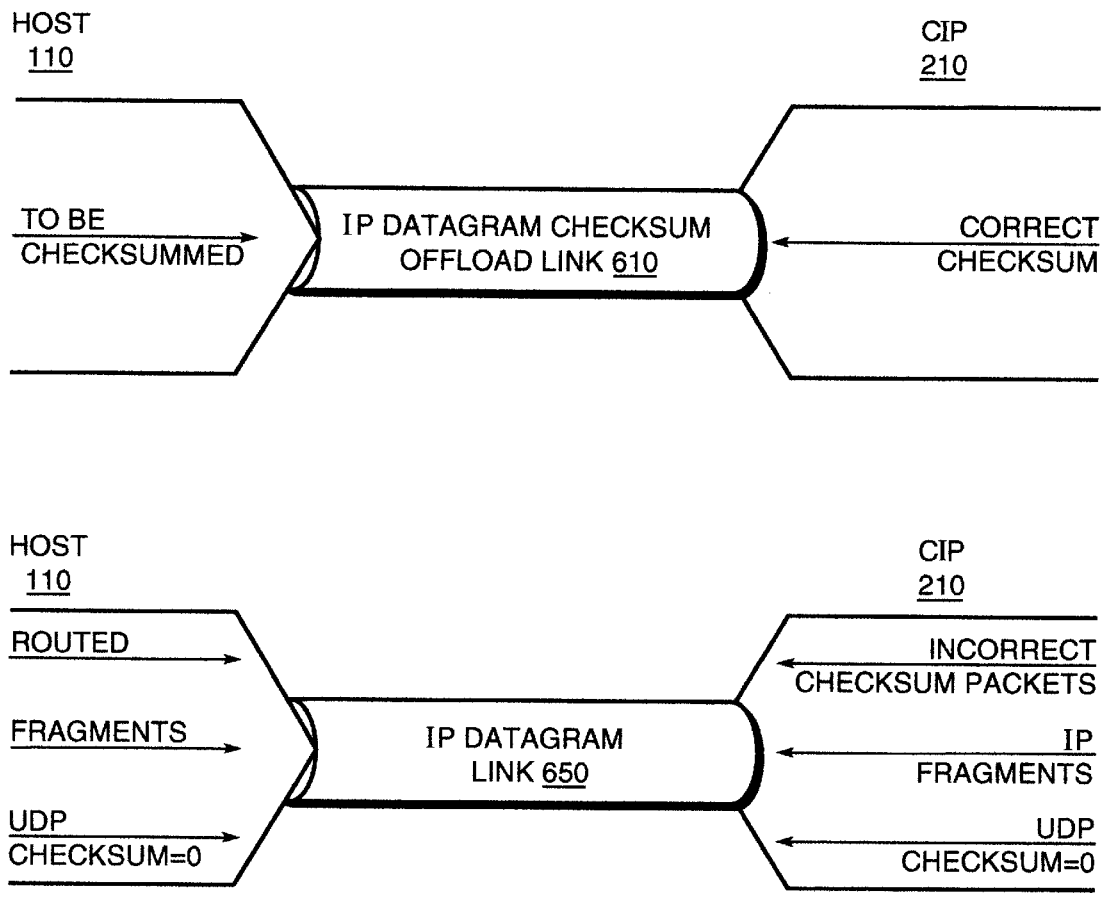
FIG. 6 is a schematic block diagram of data links illustrating use of checksum offloading in accordance with the invention.

Although the checksum offload invention reduces CPU cycles consumed by a host computer, the invention should be selectively utilized in order to increase the performance and reliability of the data processing system. FIG. 6 is a schematic block diagram illustrating situations where use of checksum offloading may or may not be advantageous. In general, checksum offloading is advantageous in those situations where the host computer functions as a source node for generating IP datagram packets to be checksummed and as a destination node for verifying the correct checksum for such packets.

Specifically, the CIP receives the packets from the host over the IP datagram checksum offload logical data link 610 and calculates checksums prior to transferring the packets over the network. In addition, the CIP receives packets from the network and verifies the checksum prior to passing the packets over the channel to the destination node. For each packet having a correct checksum, the link 610 is used for data transmission to the host. However if the checksum is incorrect, the packet is passed to the host over the normal IP datagram logical data link 650; this enables the host to process the packet in a typical manner (i.e., perform its own checksum verification) and record the error in a statistics database.

In a situation where the host functions as a router by sending packets that it has received from another interface to the CIP, checksum offload is non-advantageous because recalculation of the checksum by the CIP would destroy the intended end-to-end reliability mechanism. Transmission of packet fragments is also not generally appropriate for checksum offload because checksumming is typically associated with an entire packet; processing of such fragments is expensive in terms of time and resources since the fragments must be correctly assembled prior to verifying the checksum for the entire packet. Finally, conventional checksum algorithms mandate that checksumming is not performed where the value of the checksum bits is equal to zero (e.g., in the case of UDP packets); clearly, these packets are not candidates for checksum offloading. For each of these situations, the normal IP datagram logical data link 650 is typically used for packet transmissions between the host and CIP; however, it will be understood to those skilled in the art that in each of those situations checksum offloading could be performed by the CIP in accordance with the teachings set forth herein.

Referring again to FIG. 3, a CLAW checksum offload application (CKSUMOFF APP) is provided for performing checksum offload in each of the host and CIP. An IP packet without checksum is sent from the host over the IP checksum offload link 330 to the CIP 210, where a checksum is calculated by the CKSUMOFF application. The resulting checksum value is loaded into a conventional TCP or UDP header of the packet and the packet is passed to the router 260. The router stores the packet until it is forwarded over the IP network 360 to a destination (CLIENT) node 370 in accordance with routing calculations performed by the IP layer.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. Method for use by a control unit in checksum operations for predetermined packets, the method comprising the steps of:

providing a first data link between the control unit and a host computer of a network, the first data link being for passing a selected portion of the predetermined packets; and providing a second data link between the control unit and the host computer for passing a remaining portion of the predetermined packets;

wherein at least one packet, as received by the control unit from the network, contains a checksum value, and the control unit selects one of the first and second data links via which to transmit the at least one packet to the host computer based upon whether the checksum value is verified by the control unit as correct for the at least one packet.

2. The method of claim 1 wherein the first and second data links are logical links of a channel and wherein the predetermined packets are Internet protocol (IP) datagram packets.

3. The method of claim 2 further comprising the steps of:

creating the first data link of the channel by executing a first connection request sequence between the host computer and control unit, and creating the second data link of the channel by executing a second connection resquest sequence between the host computer and control unit.

4. The method of claim 3 wherein the first data link is an IP checksum offload link and the second data link is an IP datagram link.

5. The method of claim 4 further comprising the steps of:

generating at least one IP datagram packet that does not contain checksum information at the host computer;

transmitting the IP datagram packet to the control unit over the IP checksum offload link;

calculating a checksum for the IP datagram packet at the control unit;

loading the checksum into a header of the packet; and transferring the packet from the control unit over the computer network.

6. The method of claim 5 wherein the calculation of the checksum value is performed by an IP checksum offload application executing on the control unit.

7. The method of claim 4 further comprising the steps of:

receiving an IP datagram packet from the computer network at the control unit, the IP datagram packet containing a checksum value previously calculated by a source node;

recalculating the checksum value and verifying, as correct, at the control unit the checksum value previously calculated by the source node; and if the checksum value previously calculated by the source node is verified, forwarding the IP datagram packet to the host computer over the IP checksum offload link.

8. The method of claim 7 further comprising the step of, if the checksum value previously calculated by the source node is not verified as correct:

forwarding the IP datagram packet to the host computer over the IP datagram link;

processing the IP datagram packet at the host computer; and recording any errors at the host computer.

9. The method of claim 7 wherein the recalculation of the checksum value is performed by an IP checksum offload application executing on the control unit.

10. Apparatus for enabling a control unit to perform checksum operations for Internet protocol (IP) packets, the apparatus comprising:

a channel connecting a host computer of a network to the control unit, the channel including (i) a first logical data link for transporting a selected portion of the IP packets and (ii) a second logical data link for transporting a remaining portion of the IP packets;

wherein at least one packet as received by the control unit from the network, contains a checksum value, and the control unit is configured to select one of the first and second data links via which to transmit the at least one packet to the host computer based upon whether the checksum value is verified by the control unit as correct for the at least one packet.

11. The apparatus of claim 10 further comprising:

a host central processing unit (CPU) of the host computer, the host CPU executing a first control process to create a control message specifying a checksum offload option;

a channel CPU of the host computer coupled between the host CPU and the channel, the channel CPU transmitting the control message to the control unit over a control link;

a channel adapter of the control unit coupled to the channel, the channel adapter receiving the control message from the control link; and a control unit CPU coupled to the channel adapter, the control unit CPU executing a second control process to interpret the control message as a request to invoke a checksum offload protocol between the first and second control processes.

12. The apparatus of claim 11 wherein the control message comprises an option name field whose contents specify the requested checksum offload protocol.

13. The apparatus of claim 12 wherein the first and second control processes are common link access to workstation applications residing within lower-level layers of protocol stacks within the host computer and the control unit.

* * * * *